United States Patent
Lin

(10) Patent No.: US 9,354,444 B2
(45) Date of Patent: May 31, 2016

(54) ANNULAR OPTICAL SPACER AND OPTICAL LENS SYSTEM

(71) Applicant: LARGAN PRECISION CO., LTD., Taichung (TW)

(72) Inventor: Cheng-Feng Lin, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 94 days.

(21) Appl. No.: 14/265,350

(22) Filed: Apr. 29, 2014

(65) Prior Publication Data

US 2015/0253569 A1 Sep. 10, 2015

(30) Foreign Application Priority Data

Mar. 5, 2014 (TW) ............................. 103203742 U

(51) Int. Cl.
  *G02B 13/00* (2006.01)
  *G02B 7/02* (2006.01)
  *G02B 27/00* (2006.01)
  *G02B 5/00* (2006.01)

(52) U.S. Cl.
  CPC ............ *G02B 27/0018* (2013.01); *G02B 5/003* (2013.01); *G02B 5/005* (2013.01); *G02B 7/021* (2013.01); *G02B 13/001* (2013.01)

(58) Field of Classification Search
  CPC .... G02B 27/0018; G02B 5/003; G02B 7/021; G02B 13/001; G02B 5/005
  USPC .................................................. 359/503, 896
  See application file for complete search history.

(56) References Cited

U.S. PATENT DOCUMENTS

| 8,496,338 | B2* | 7/2013 | Ho .......................... | G02B 7/021 359/503 |
| 9,019,617 | B2* | 4/2015 | Tsai .................... | G02B 13/0015 359/642 |
| 9,063,332 | B2* | 6/2015 | Kim ........................ | G02B 1/116 |
| 2011/0261569 | A1* | 10/2011 | Kayanuma .......... | F21S 48/1154 362/311.02 |
| 2012/0314288 | A1* | 12/2012 | Lai ..................... | G02B 13/0035 359/503 |
| 2015/0234145 | A1* | 8/2015 | Chang .................... | G02B 7/021 359/811 |
| 2015/0253532 | A1* | 9/2015 | Lin ........................ | G02B 7/021 359/601 |

* cited by examiner

*Primary Examiner* — Bumsuk Won
*Assistant Examiner* — Grant Gagnon
(74) *Attorney, Agent, or Firm* — CKC & Partners Co., Ltd.

(57) ABSTRACT

An annular optical spacer includes an outer annular surface, an inner annular surface, a first side surface, a second side surface and a plurality of protruding structures. The inner annular surface surrounds a central axis of the annular optical spacer and is opposite to the outer annular surface. The first side surface connects the outer annular surface with the inner annular surface. The second side surface connects the outer annular surface with the inner annular surface and is opposite to the first side surface. The protruding structures are regularly disposed on the inner annular surface. Each of the protruding structures extends along a direction from the first side surface to the second side surface and is integrated with the inner annular surface.

21 Claims, 13 Drawing Sheets

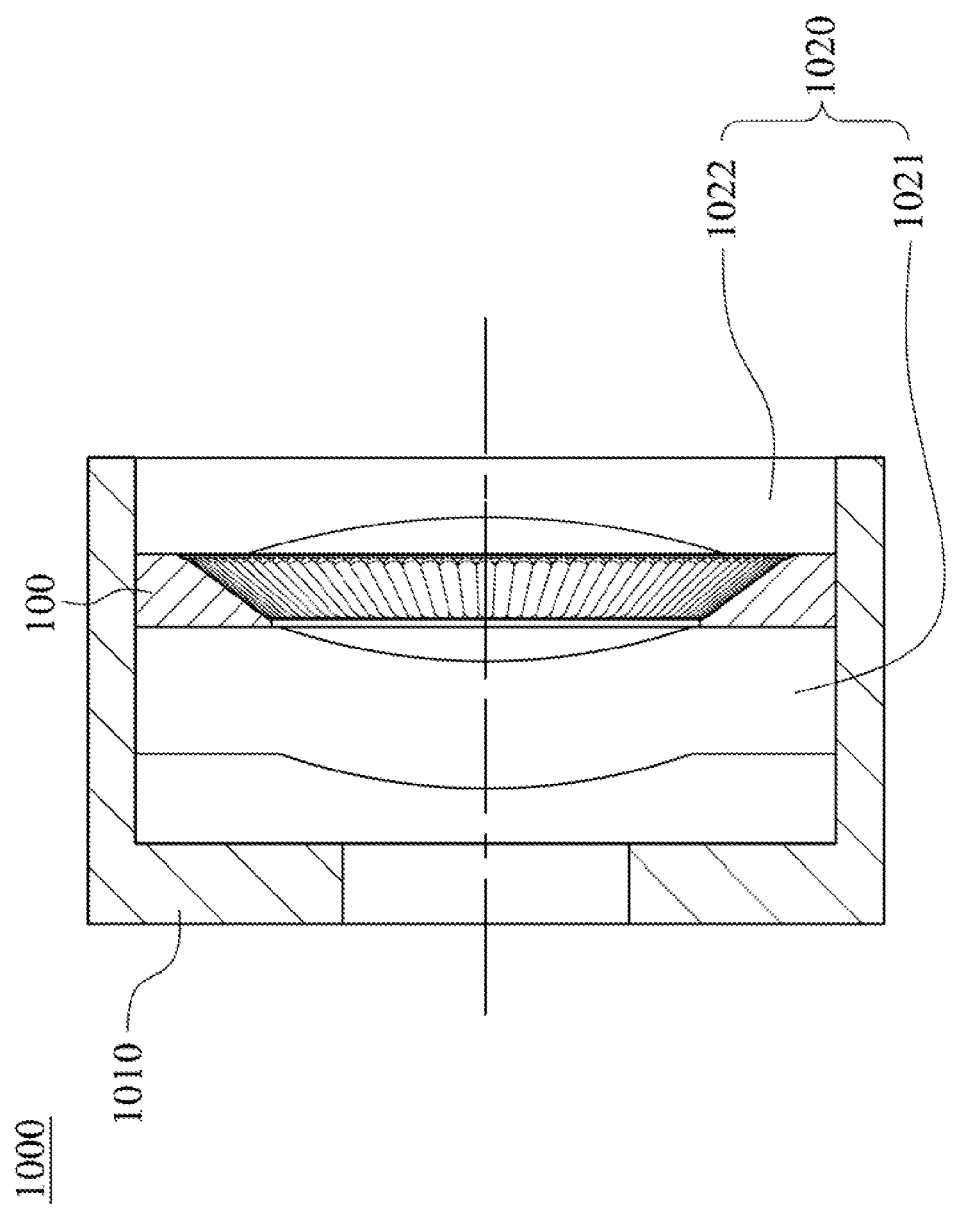

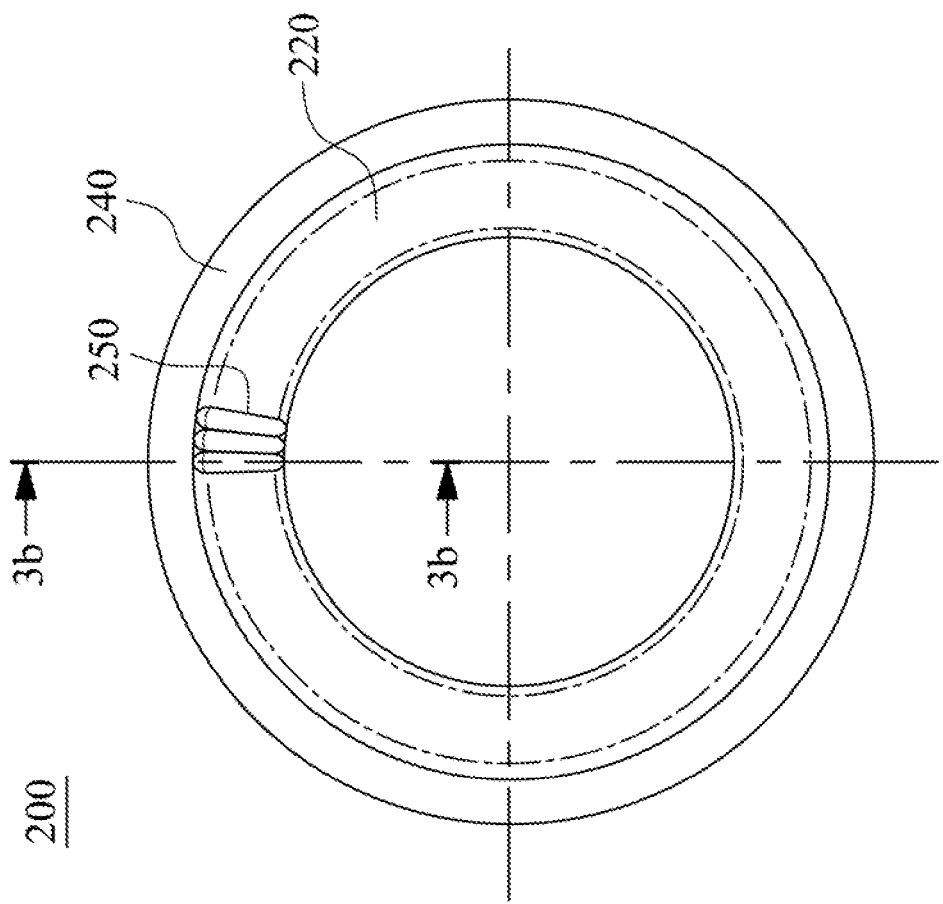
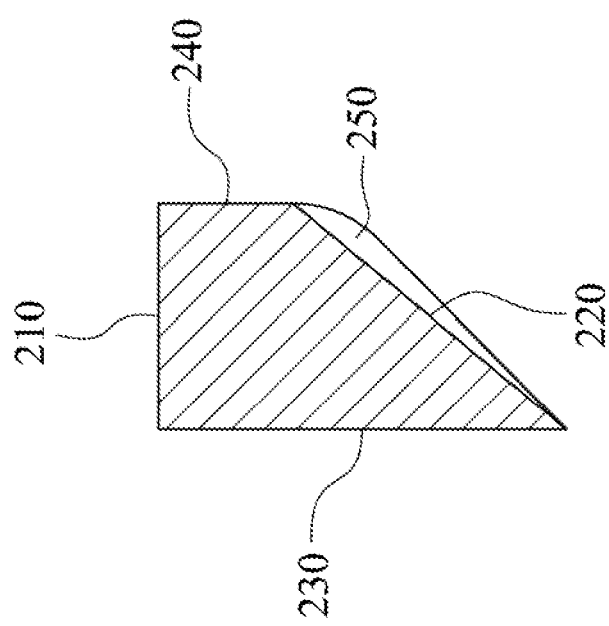
Fig. 3A
Fig. 3B

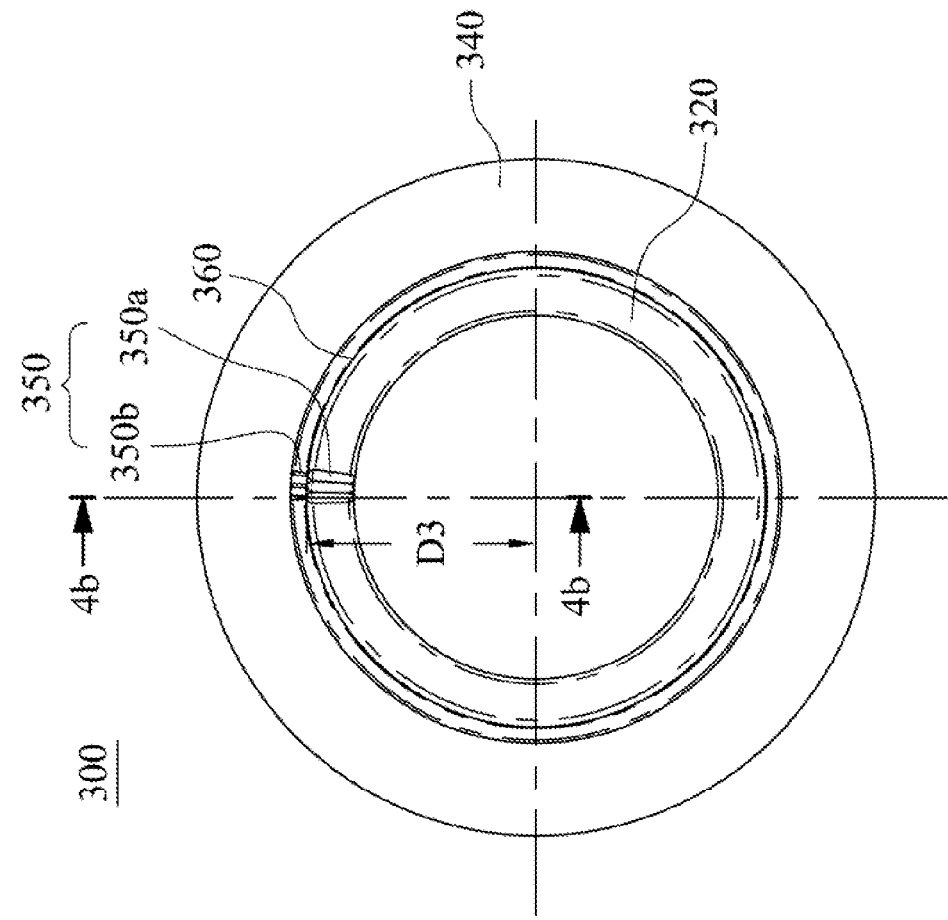
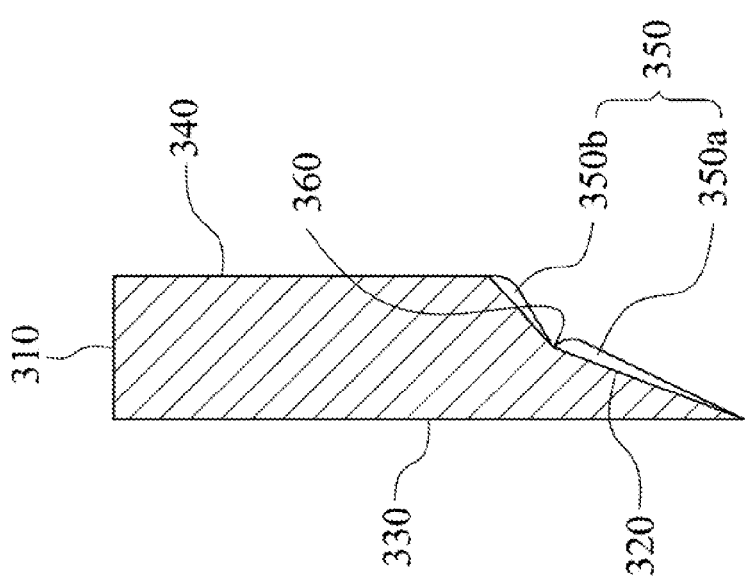
Fig. 4A
Fig. 4B

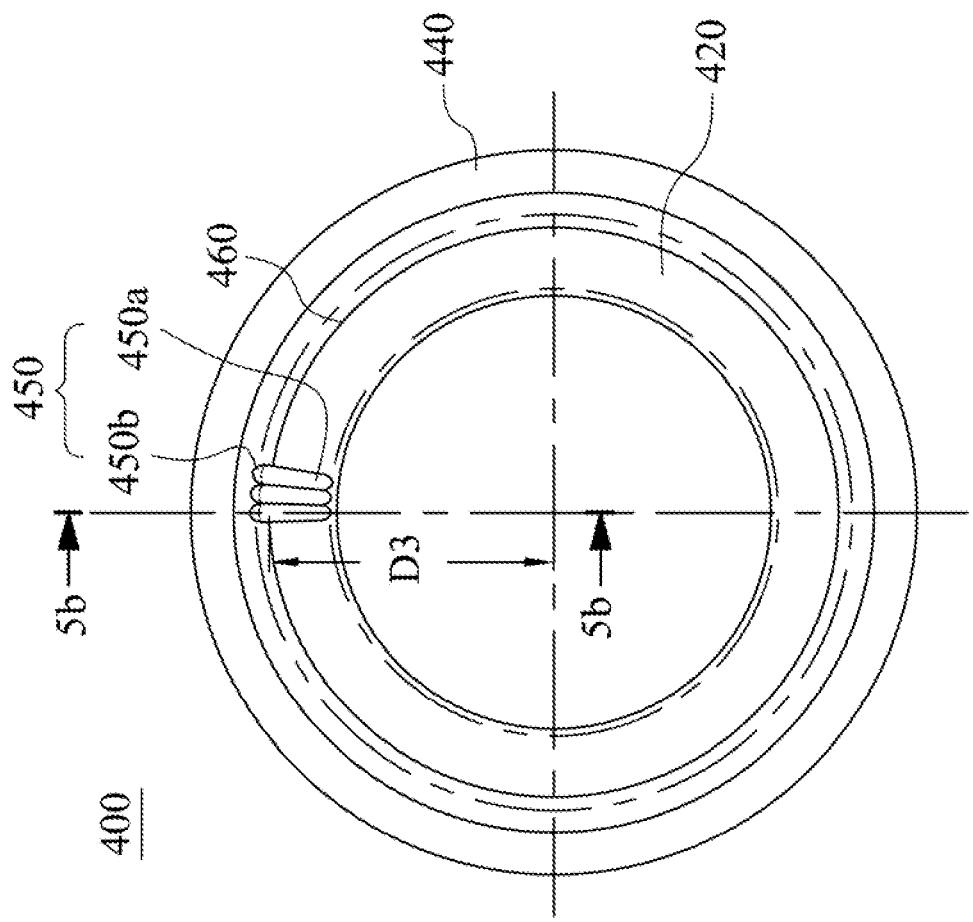
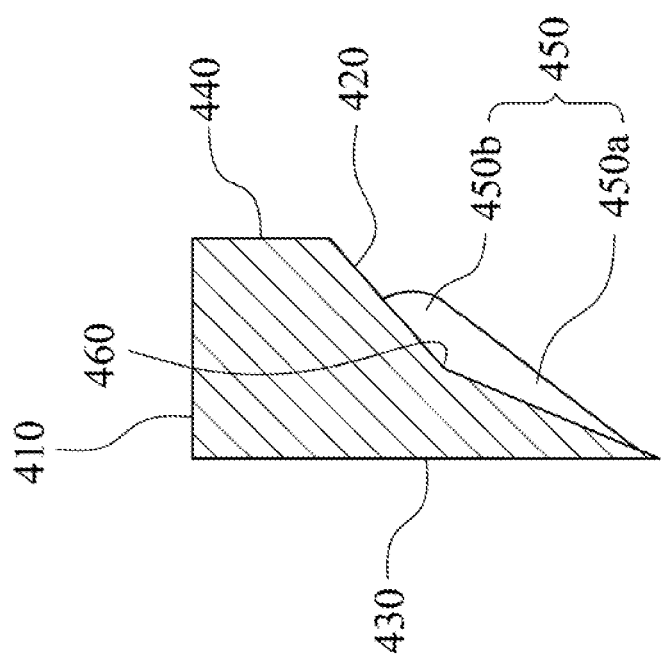

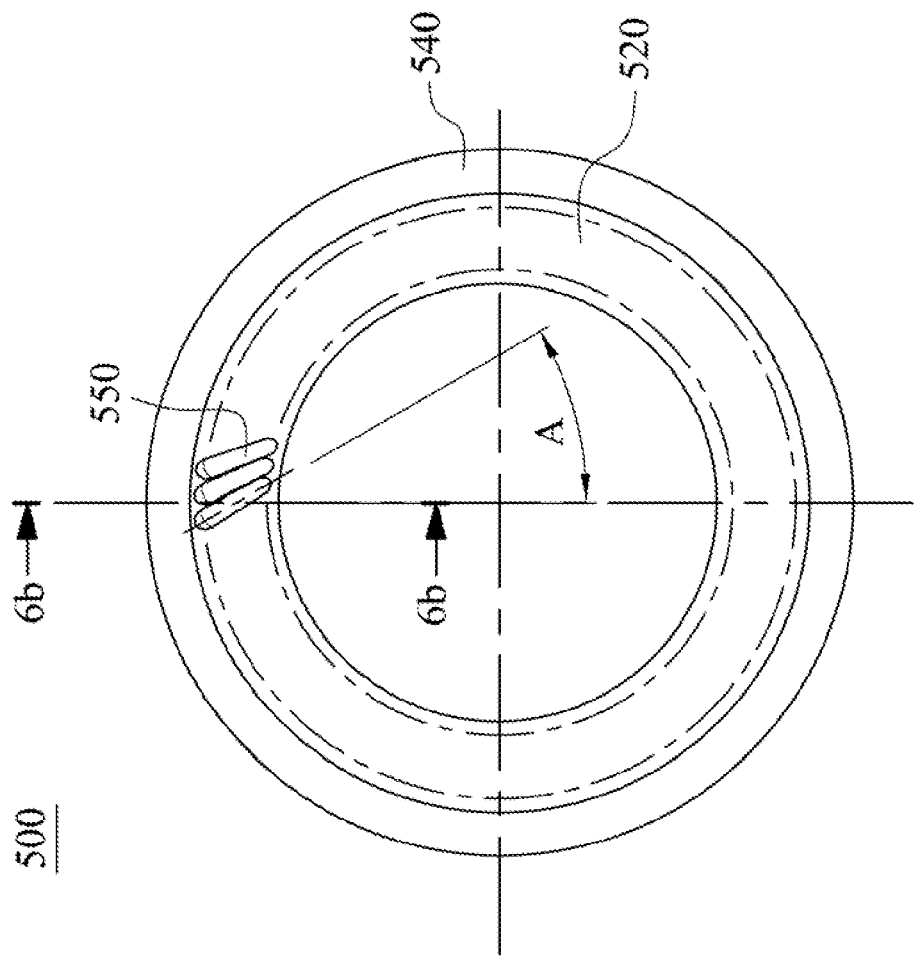
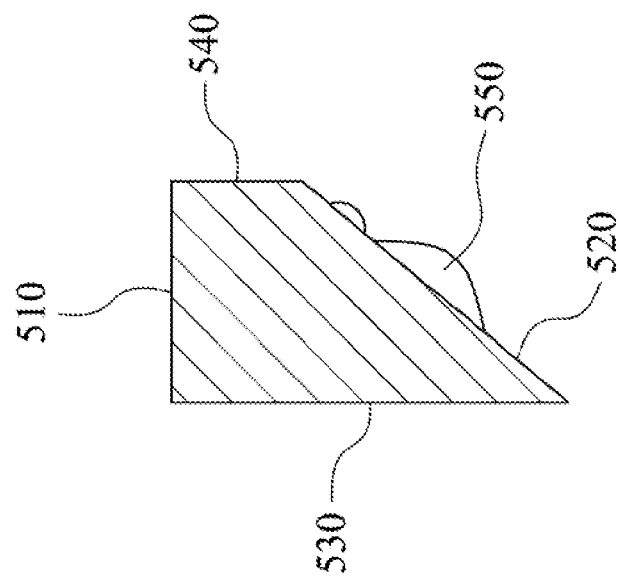

ANNULAR OPTICAL SPACER AND OPTICAL LENS SYSTEM

RELATED APPLICATIONS

This application claims priority to Taiwan Application Serial Number 103203742, filed Mar. 5, 2014, which is herein incorporated by reference.

BACKGROUND

1. Technical Field

The present disclosure relates to an annular optical spacer. More particularly, the present disclosure relates to an annular optical spacer with protruding structures.

2. Description of Related Art

Due to the popularity of personal electronic products and mobile communication products having camera functionalities, such as smart phones and tablet personal computers, the demand for compact optical systems has been increasing. The compact optical systems have gradually evolved toward the field of higher megapixels, and have to satisfy the requirements of lightweight and high image quality.

A compact optical system generally includes a plurality of lenses and at least one optical spacer. The optical spacer is disposed between two adjacent lenses for controlling a separation distance between the two lenses, so that damages caused by scraping and colliding between the two lenses can be avoided.

FIG. 1A is a front schematic view of a conventional optical spacer 10. FIG. 1B is a partially enlarged cross-sectional view taken along line 1b-1b of the optical spacer 10 in FIG. 1A. In FIG. 1A, the optical spacer 10 has a smooth surface 11. As shown in FIG. 1B, when an incident light M1 strikes the surface 11, a reflected light R1 is formed complying with the law of reflection. A diffuse reflection hardly occurs due to the smoothness of the surface 11, and the reflected light R1 tends to enter into the optical effective region so as the form an unexpected light. When the number of the unexpected lights is excessive, the image quality is poor and thereby cannot satisfy the requirements of high-end optical systems with camera functionalities.

SUMMARY

According to one aspect of the present disclosure, an annular optical spacer includes an outer annular surface, an inner annular surface, a first side surface, a second side surface and a plurality of protruding structures. The inner annular surface surrounds a central axis of the annular optical spacer and is opposite to the outer annular surface. The first side surface connects the outer annular surface with the inner annular surface. The second side surface connects the outer annular surface with the inner annular surface and is opposite to the first side surface. The protruding structures are regularly disposed on the inner annular surface. Each of the protruding structures extends along a direction from the first side surface to the second side surface and is integrated with the inner annular surface.

According to another aspect of the present disclosure, an optical lens system includes a barrel, a lens assembly and an annular optical spacer. The lens assembly is disposed in the barrel. The annular optical spacer is disposed in the barrel and connected with the lens assembly. The annular optical spacer includes an outer annular surface, an inner annular surface, a first side surface, a second side surface and a plurality of protruding structures. The inner annular surface surrounds a central axis of the annular optical spacer and is opposite to the outer annular surface. The first side surface connects the outer annular surface with the inner annular surface. The second side surface connects the outer annular surface with the inner annular surface and is opposite to the first side surface. The protruding structures are regularly disposed on the inner annular surface. Each of the protruding structures extends along a direction from the first side surface to the second side surface and is integrated with the inner annular surface.

BRIEF DESCRIPTION OF THE DRAWINGS

The disclosure can be more fully understood by reading the following detailed description of the embodiment, with reference made to the accompanying drawings as follows:

FIG. 2H is a cross-sectional view of an optical lens system according to yet another embodiment of the present disclosure;

FIG. 3A is a front schematic view of an annular optical spacer according to 1st example of the present disclosure;

FIG. 3B is a partially enlarged cross-sectional view taken along line 3b-3b of the annular optical spacer in FIG. 3A;

FIG. 4A is a front schematic view of an annular optical spacer according to 2nd example of the present disclosure;

FIG. 4B is a partially enlarged cross-sectional view taken along line 4b-4b of the annular optical spacer in FIG. 4A;

FIG. 5A is a front schematic view of an annular optical spacer according to 3rd example of the present disclosure;

FIG. 5B is a partially enlarged cross-sectional view taken along line 5b-5b of the annular optical spacer in FIG. 5A;

FIG. 6A is a front schematic view of an annular optical spacer according to 4th example of the present disclosure;

FIG. 6B is a partially enlarged cross-sectional view taken along line 6b-6b of the annular optical spacer in FIG. 6A;

DETAILED DESCRIPTION

Figure 2A:
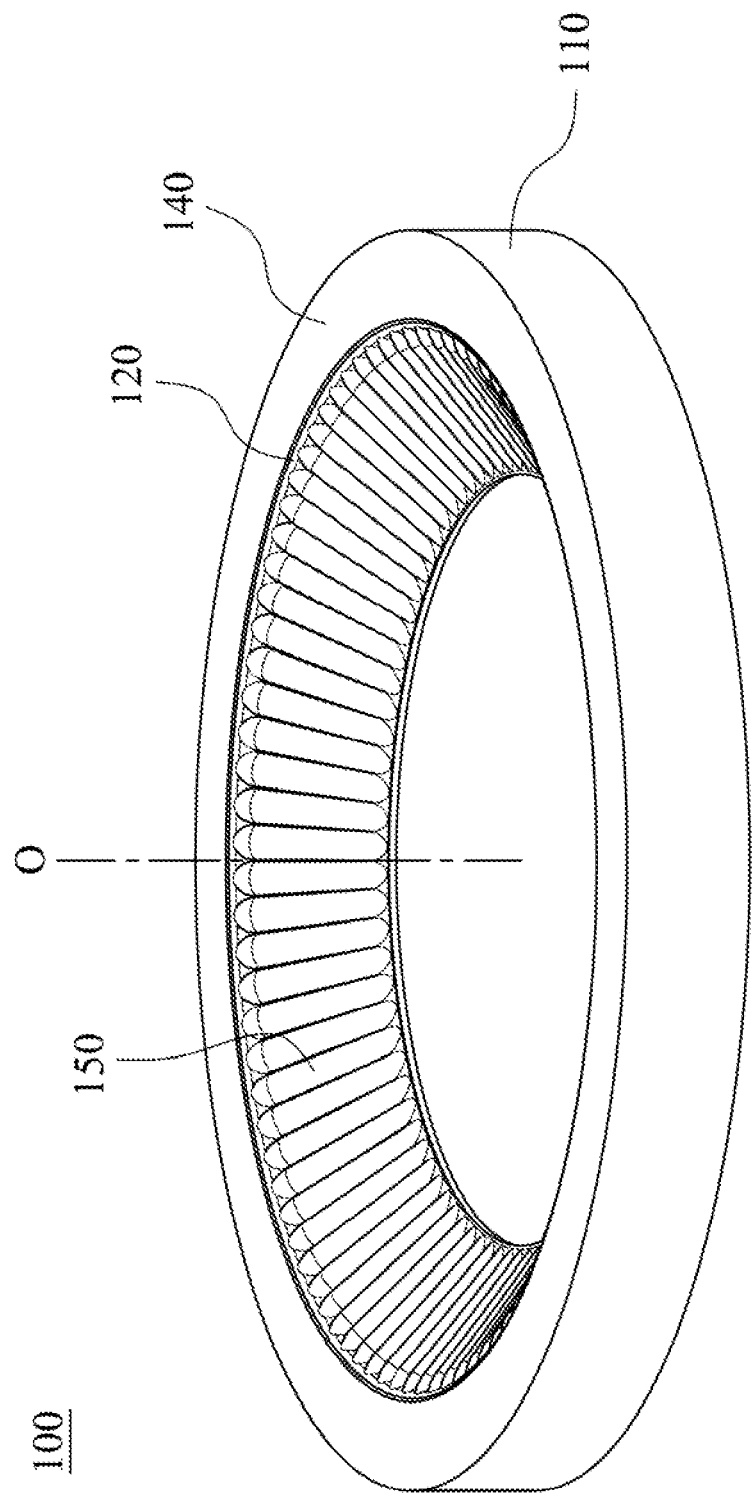
FIG. 2A is a three-dimensional view of an annular optical spacer according to one embodiment of the present disclosure.
Figure 2B:
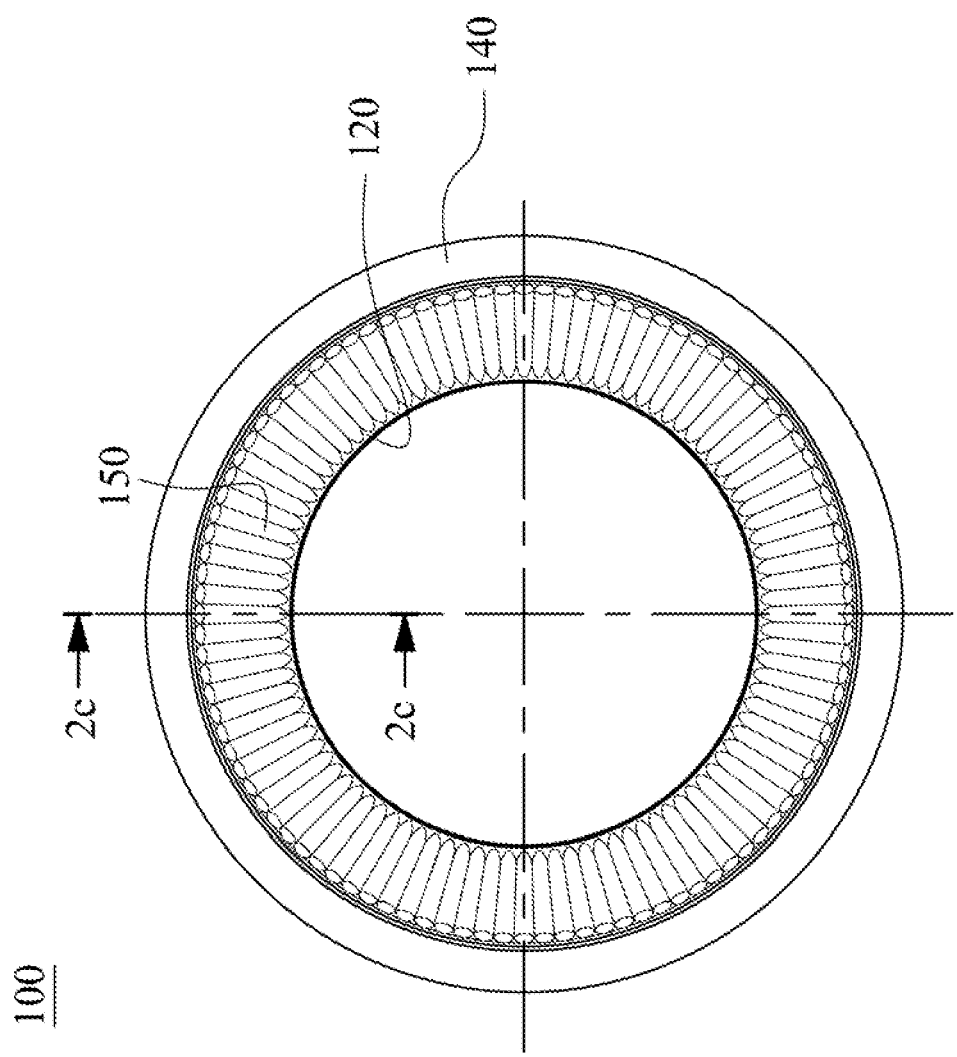
FIG. 2B is a front schematic view of the annular optical spacer in FIG. 2A.

FIG. 2A is a three-dimensional view of an annular optical spacer 100 according to one embodiment of the present disclosure. FIG. 2B is a front schematic view of the annular optical spacer 100 in FIG. 2A. The annular optical spacer 100 includes an outer annular surface 110, an inner annular surface 120, a first side surface 130 (shown in FIG. 2C), a second side surface 140 and a plurality of protruding structures 150. The inner annular surface 120 surrounds a central axis O of the annular optical spacer 100 and is opposite to the outer annular surface 110. The first side surface 130 connects the outer annular surface 110 with the inner annular surface 120. The second side surface 140 connects the outer annular surface 110 with the inner annular surface 120 and is opposite to the first side surface 130. The protruding structures 150 are regularly disposed on the inner annular surface 120. Each of the protruding structures 150 extends along a direction from the first side surface 130 to the second side surface 140. Therefore, the annular optical spacer 100 has a larger surface area for absorbing unexpected lights, and the space between any two protruding structures 150 can reduce a probability of reflected lights entering into the optical effective region so as to further suppress the unexpected lights. Accordingly, the image quality can be enhanced. Furthermore, a structural strength of the annular optical spacer 100 is enhanced by each of the protruding structures 150 extending along the direction from the first side surface 130 to the second side surface 140.

The aforementioned "regularly" means that each of the protruding structures 150 is disposed on the inner annular surface 120 with a predetermined orientation. Instead of being disposed on the inner annular surface 120 with a random orientation, the regularly disposed protruding structures 150 can provide an effect of guiding the unexpected lights to a predetermined direction.

Figure 1A:
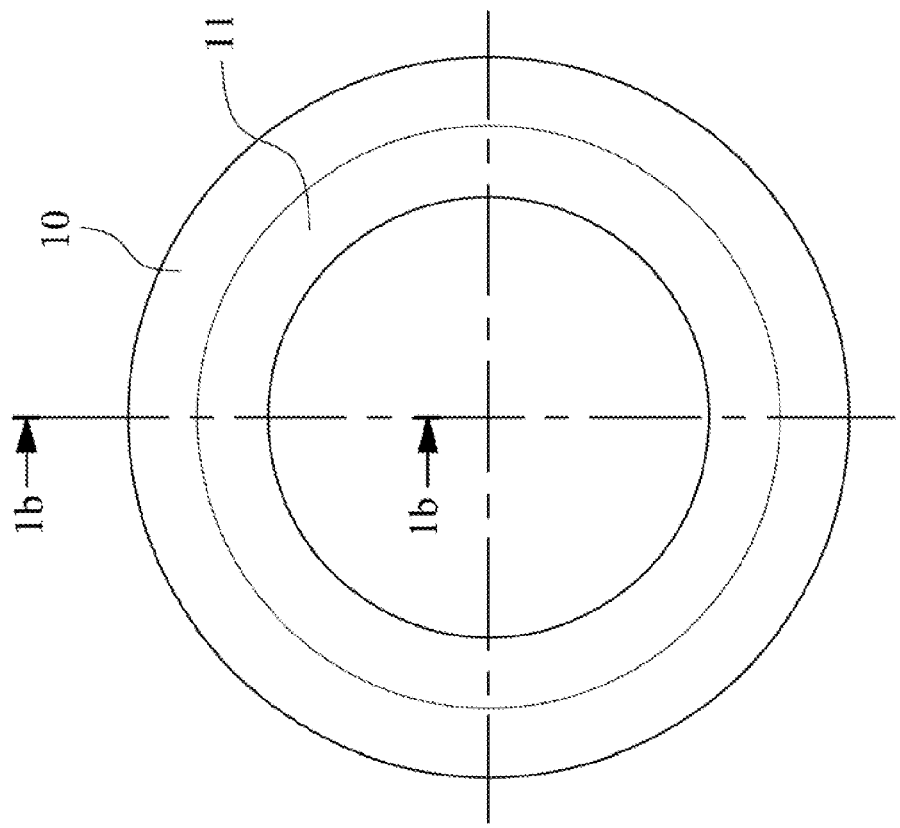
FIG. 1A is a front schematic view of a conventional optical spacer.
Figure 1B:
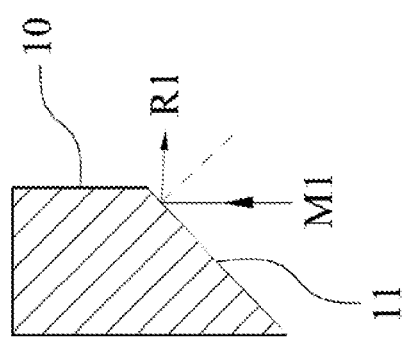
FIG. 1B is a partially enlarged cross-sectional view taken along line 1b-1b of the optical spacer in FIG. 1A.
Figure 2C:
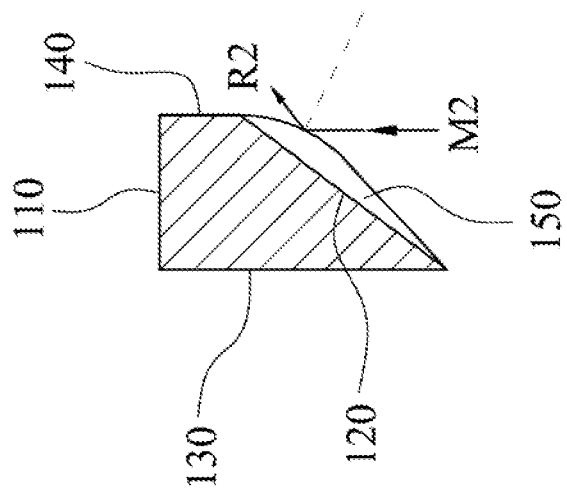
FIG. 2C is a partially enlarged cross-sectional view taken along line 2c-2c of the annular optical spacer in FIG. 2B.

FIG. 2C is a partially enlarged cross-sectional view taken along line 2c-2c of the annular optical spacer 100 in FIG. 2B. In FIG. 2C, an incident light M2 strikes a protruding structure 150 and a reflected light R2 is formed complying with the law of reflection. As shown in FIG. 1B and FIG. 2C, a probability of the reflected light R2 entering into the optical effective region is smaller than that of the reflected light R1. As a result, the effect of suppressing the unexpected lights provided by the annular optical spacer 100 is better than that provided by a conventional optical spacer.

Figure 2D:
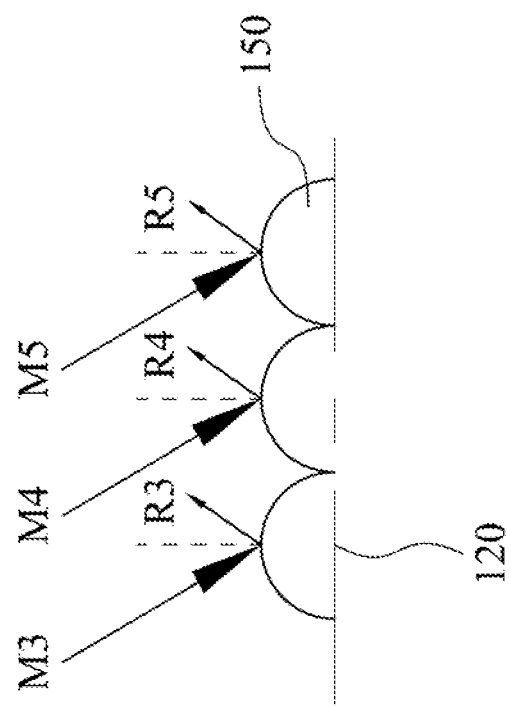
FIG. 2D shows light paths of the annular optical spacer in FIG. 2A.

FIG. 2D shows light paths of the annular optical spacer 100 in FIG. 2A. In FIG. 2D, an incident light M3, an incident light M4 and an incident light M5 strike the protruding structures 150, and a reflected light R3, a reflected light R4 and a reflected light R5 are formed complying with the law of reflection. Due to the regular disposition of the protruding structures 150, the reflected lights (R3-R5) can be guided to a predetermined direction. For example, the reflected lights (R3-R5) can be guided to a region other than the optical effective region so as to suppress the unexpected lights. A conventional rugged surface, such as a rugged surface obtained by a sandblasting method, has uneven structures. The uneven structures of the rugged surface are irregular, and the unexpected lights cannot be guided to a desired direction for effectively suppressing the unexpected lights. Therefore, the effect of suppressing the unexpected lights provided by the annular optical spacer 100 can be significantly enhanced by guiding the unexpected lights via the regularly disposed protruding structures 150, and the image quality can be enhanced accordingly.

In FIG. 2A and FIG. 2B, each of the protruding structures 150 is integrated with the inner annular surface 120. Therefore, the manufacturing yield rate of the annular optical spacer 100 can be enhanced.

There is a shortest distance between each of the protruding structures 150 and the central axis O of the annular optical spacer 100, and the shortest distances can be the same. Therefore, the manufacturing yield rate of the annular optical spacer 100 can be enhanced.

Figure 2E:
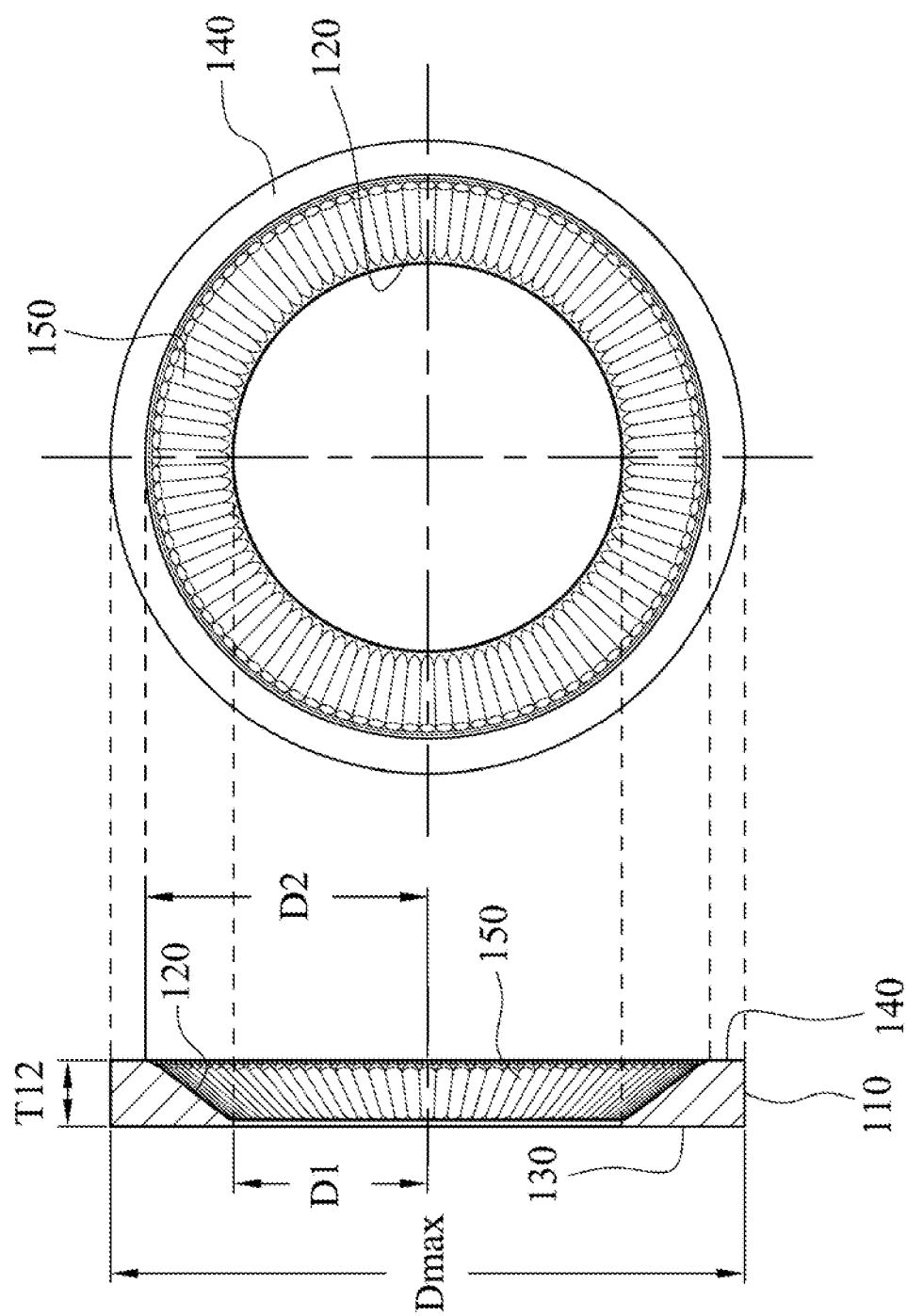
FIG. 2E shows parameters of the annular optical spacer in FIG. 2A.

FIG. 2E shows parameters of the annular optical spacer 100 in FIG. 2A. In FIG. 2E, a shortest distance between the first side surface 130 and the central axis O of the annular optical spacer 100 is D1, a shortest distance between the second side surface 140 and the central axis O of the annular optical spacer 100 is D2, a distance between the first side surface 130 and the second side surface 140 in parallel with the central axis O of the annular optical spacer 100 is T12, and a maximum outer diameter of the annular optical spacer 100 is Dmax.

When the shortest distance between the first side surface 130 and the central axis O of the annular optical spacer 100 is D1, and the shortest distance between the second side surface 140 and the central axis O of the annular optical spacer 100 is D2, the following relationship can be satisfied: D1<D2. Therefore, the annular optical spacer 100 can be disposed in an optical lens system having a short total track length. Preferably, the following relationship can be satisfied: 0.50<D1/D2<0.90.

When the distance between the first side surface 130 and the second side surface 140 in parallel with the central axis O of the annular optical spacer 100 is T12, and the maximum outer diameter of the annular optical spacer 100 is Dmax, the following relationship can be satisfied: 0.03<T12/Dmax<0.5. Therefore, the annular optical spacer 100 can be applied to a compact optical lens system, and can provide a desirable structural strength at the same time. Preferably, the following relationship can be satisfied: 0.05<T12/Dmax<0.2.

The annular optical spacer 100 can further include a bent portion (as shown in the 2nd example). The bent portion is formed on the inner annular surface 120 and located between the first side surface 130 and the second side surface 140. Therefore, the surface area of the annular optical spacer 100 can be broadened, and the unexpected lights can be effectively suppressed. Furthermore, each of the protruding structures 150 can include a first protruding portion and a second protruding portion (as shown in the 2nd example). The second protruding portions are disposed farther from the central axis O of the annular optical spacer 100 than the first protruding portions. Specifically, the first protruding portions are disposed between the first side surface 130 and the bent portion, and the second protruding portions are disposed between the bent portion and the second side surface 140. Therefore, the unexpected lights can be further suppressed.

The protruding structures 150 can be equally spaced around the central axis O of the annular optical spacer 100. Therefore, the manufacturing difficulty of the annular optical spacer 100 can be reduced, and the structural strength of the annular optical spacer 100 can be enhanced.

The protruding structures 150 can be connected with each other. Therefore, the unexpected lights can be further suppressed.

When the maximum outer diameter of the annular optical spacer 100 is Dmax, the following relationship can be satisfied: Dmax<10 mm. Therefore, the unexpected lights can be effectively suppressed, and the annular optical spacer 100 can be applied to a compact optical lens system.

The protruding structures 150 can have a same shape. The protruding structures 150 can have a same size. Therefore, the manufacturing difficulty of the annular optical spacer 100 can be reduced, and the structural strength of the annular optical spacer 100 can be enhanced.

When a light absorption rate of the annular optical spacer 100 is Ac, the following relationship can be satisfied:

Ac>90%. Therefore, the unexpected lights can be effectively suppressed so as to enhance the image quality. The aforementioned light absorption rate can be calculated from a measured value of a reflectivity of a surface of the annular optical spacer 100.

The annular optical spacer 100 can be made of plastic material. Therefore, the annular optical spacer 100 can be applied to a lightweight optical lens system.

The annular optical spacer 100 can be made of metallic material. Therefore, the structural rigidity of the annular optical spacer 100 can be enhanced.

Figure 2F:
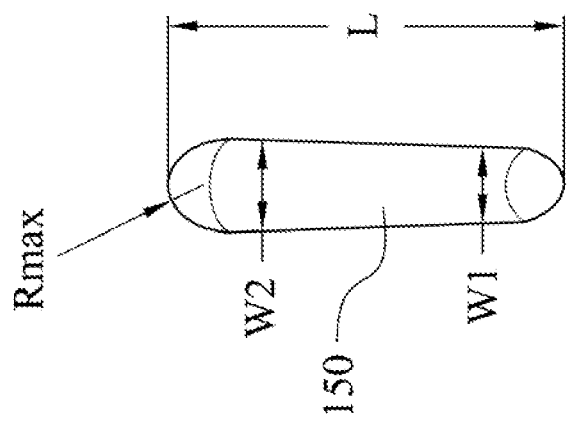
FIG. 2F is a schematic view of a protruding structure in FIG. 2A.

FIG. 2F is a schematic view of one of the protruding structures 150 in FIG. 2A. A cross-section of each of the protruding structures 150 can be arc-shaped. When a maximum curvature radius of each of the protruding structures 150 is Rmax, the following relationship can be satisfied: 0.01 mm<Rmax. Therefore, the unexpected lights can be further suppressed. Furthermore, each of the protruding structures 150 can include a surface length L and a plurality of widths, such as a first width W1 and a second width W2. The surface length L is a farthest distance between two points on a surface of each of the protruding structure 150. The widths are perpendicular to the surface length L, and the widths become smaller as getting closer to the central axis O of the annular optical spacer 100. For an example, the first width W1 is closer to the central axis O of the annular optical spacer 100 than the second width W2, so that the first width W1 is smaller than the second width W2. Therefore, it is favorable to completely cover the inner annular surface 120 with the protruding structures 150, and the unexpected lights can be effectively suppressed.

Figure 2G:
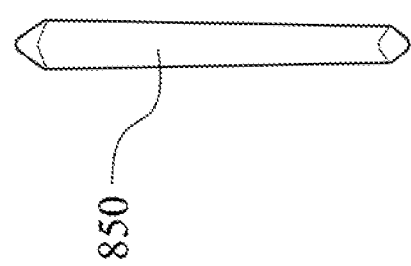
FIG. 2G is schematic view of a protruding structure of an annular optical spacer according to another embodiment of the present disclosure.

FIG. 2G is schematic view of a protruding structure 850 of an annular optical spacer according to another embodiment of the present disclosure. A cross-section of the protruding structure 850 can be triangular. Therefore, the structural strength of the annular optical spacer can be enhanced.

As shown in FIG. 2F and FIG. 2G, the shape and the size of the protruding structures can be flexibly adjusted according to practical demands, and the applications of the annular optical spacer can be increased.

FIG. 2H is a cross-sectional view of an optical lens system 1000 according to yet another embodiment of the present disclosure. The optical lens system 1000 can be applied to mobile terminals, such as mobile phones or tablets. In FIG. 2H, the optical lens system 1000 includes a barrel 1000, a lens assembly 1020 and the annular optical spacer 100. The lens assembly 1020 is disposed in the barrel 1010. The annular optical spacer 100 is disposed in the barrel 1010 and connected with the lens assembly 1020. Specifically, the lens assembly 1020 includes a first lens 1021 and a second lens 1022, and the annular optical spacer 100 is disposed between the first lens 1021 and the second lens 1022. The details of the annular optical spacer 100 have been described in the foregoing paragraphs and will not be repeated herein. The lights can be guided to a predetermined direction via the annular optical spacer 100 for suppressing the unexpected lights, so that the image quality and the structural rigidity of the optical lens system 1000 can be effectively enhanced. Furthermore, the annular optical spacer 100 can be used as a stop, so that an extra stop is not necessary for the optical lens system 1000. Therefore, the optical lens system 1000 can be more compact and lightweight.

According to the above description of the present disclosure, the following 1st-6th specific examples are provided for further explanation.

1ST EXAMPLE

FIG. 3A is a front schematic view of an annular optical spacer 200 according to 1st example of the present disclosure. FIG. 3B is a partially enlarged cross-sectional view taken along line 3b-3b of the annular optical spacer 200 in FIG. 3A. The annular optical spacer 200 includes an outer annular surface 210, an inner annular surface 220, a first side surface 230, a second side surface 240 and a plurality of protruding structures 250. The inner annular surface 220 surrounds a central axis (its reference numeral is omitted) of the annular optical spacer 200 and is opposite to the outer annular surface 210. The first side surface 230 connects the outer annular surface 210 with the inner annular surface 220. The second side surface 240 connects the outer annular surface 210 with the inner annular surface 220 and is opposite to the first side surface 230. The protruding structures 250 are regularly disposed on the inner annular surface 220. Each of the protruding structures 250 extends along a direction from the first side surface 230 to the second side surface 240, and is integrated with the inner annular surface 220.

Only three of the protruding structures 250 are shown in FIG. 3A for simplifying. The other non-shown protruding structures 250 are disposed on the inner annular surface 220 in a similar fashion.

Specifically, there is a shortest distance between each of the protruding structures 250 and the central axis of the annular optical spacer 200, and the shortest distances are the same. The protruding structures 250 are equally spaced around the central axis of the annular optical spacer 200. Each of the protruding structures 250 includes a surface length and a plurality of widths. The surface length is a farthest distance between two points on a surface of each of the protruding structure 250. The widths are perpendicular to the surface length, and the widths become smaller as getting closer to the central axis of the annular optical spacer 200. The protruding structures 250 are connected with each other. A cross-section of each of the protruding structures 250 is arc-shaped. The protruding structures 250 have a same shape and a same size.

The annular optical spacer 200 is made of plastic material.

A shortest distance between the first side surface 230 and the central axis of the annular optical spacer 200 is D1. A shortest distance between the second side surface 240 and the central axis of the annular optical spacer 200 is D2. A distance between the first side surface 230 and the second side surface 240 in parallel with the central axis of the annular optical spacer 200 is T12. A maximum outer diameter of the annular optical spacer 200 is Dmax. A maximum curvature radius of each of the protruding structures 250 is Rmax. A light absorption rate of the annular optical spacer 200 is Ac.

The values of D1, D2, D1/D2, Dmax, T12/Dmax, Rmax and Ac of the 1st example are shown in Table 1.

TABLE 1

| 1st example | | | |
|---|---|---|---|
| D1 (mm) | 1.580 | T12/Dmax | 0.10 |
| D2 (mm) | 2.220 | Rmax (mm) | 0.08 |
| D1/D2 | 0.712 | Ac (%) | 96 |
| Dmax (mm) | 5.100 | | |

2ND EXAMPLE

FIG. 4A is a front schematic view of an annular optical spacer 300 according to 2nd example of the present disclosure. FIG. 4B is a partially enlarged cross-sectional view taken along line 4b-4b of the annular optical spacer 300 in FIG. 4A. The annular optical spacer 300 includes an outer annular surface 310, an inner annular surface 320, a first side surface 330, a second side surface 340, a bent portion 360 and a plurality of protruding structures 350. The inner annular surface 320 surrounds a central axis (its reference numeral is omitted) of the annular optical spacer 300 and is opposite to the outer annular surface 310. The first side surface 330 connects the outer annular surface 310 with the inner annular surface 320. The second side surface 340 connects the outer annular surface 310 with the inner annular surface 320 and is opposite to the first side surface 330. The bent portion 360 is formed on the inner annular surface 320 and located between the first side surface 330 and the second side surface 340. The protruding structures 350 are regularly disposed on the inner annular surface 320. Each of the protruding structures 350 extends along a direction from the first side surface 330 to the second side surface 340, and is integrated with the inner annular surface 320. Each of the protruding structures 350 includes a first protruding portion 350a and a second protruding portion 350b. The second protruding portions 350b are disposed farther from the central axis than the first protruding portions 350a. The first protruding portions 350a are disposed between the first side surface 330 and the bent portion 360, and the second protruding portions 350b are disposed between the bent portion 360 and the second side surface 340.

Only three of the protruding structures 350 are shown in FIG. 4A for simplifying. The other non-shown protruding structures 350 are disposed on the inner annular surface 320 in a similar fashion.

Specifically, there is a shortest distance between each of the protruding structures 350 and the central axis of the annular optical spacer 300, and the shortest distances are the same. The protruding structures 350 are equally spaced around the central axis of the annular optical spacer 300. The protruding structures 350 are connected with each other. A cross-section of each of the protruding structures 350 is arc-shaped. The protruding structures 350 have a same shape and a same size.

The annular optical spacer 300 is made of plastic material.

A shortest distance between the first side surface 330 and the central axis of the annular optical spacer 300 is D1. A shortest distance between the second side surface 340 and the central axis of the annular optical spacer 300 is D2. A distance between the first side surface 330 and the second side surface 340 in parallel with the central axis of the annular optical spacer 300 is T12. A maximum outer diameter of the annular optical spacer 300 is Dmax. A maximum curvature radius of each of the protruding structures 350 is Rmax. A light absorption rate of the annular optical spacer 300 is Ac. A distance between the bent portion 360 and the central axis of the annular optical spacer 300 is D3.

The values of D1, D2, D1/D2, Dmax, T12/Dmax, Rmax, Ac and D3 of the 2nd example are shown in Table 2.

TABLE 2

| 2nd example | | | |
|---|---|---|---|
| D1 (mm) | 1.425 | T12/Dmax | 0.11 |
| D2 (mm) | 1.921 | Rmax (mm) | 0.05 |
| D1/D2 | 0.742 | Ac (%) | 95 |
| Dmax (mm) | 5.300 | D3 (mm) | 1.795 |

3RD EXAMPLE

FIG. 5A is a front schematic view of an annular optical spacer 400 according to 3rd example of the present disclosure. FIG. 5B is a partially enlarged cross-sectional view taken along line 5b-5b of the annular optical spacer 400 in FIG. 5A. The annular optical spacer 400 includes an outer annular surface 410, an inner annular surface 420, a first side surface 430, a second side surface 440, a bent portion 460 and a plurality of protruding structures 450. The inner annular surface 420 surrounds a central axis (its reference numeral is omitted) of the annular optical spacer 400 and is opposite to the outer annular surface 410. The first side surface 430 connects the outer annular surface 410 with the inner annular surface 420. The second side surface 440 connects the outer annular surface 410 with the inner annular surface 420 and is opposite to the first side surface 430. The bent portion 460 is formed on the inner annular surface 420 and located between the first side surface 430 and the second side surface 440. The protruding structures 450 are regularly disposed on the inner annular surface 420. Each of the protruding structures 450 extends along a direction from the first side surface 430 to the second side surface 440, and is integrated with the inner annular surface 420. Each of the protruding structures 450 includes a first protruding portion 450a and a second protruding portion 450b. The second protruding portions 450b are disposed farther from the central axis than the first protruding portions 450a. The first protruding portions 450a are disposed between the first side surface 430 and the bent portion 460, and the second protruding portions 450b are disposed between the bent portion 460 and the second side surface 440.

Only three of the protruding structures 450 are shown in FIG. 5A for simplifying. The other non-shown protruding structures 450 are disposed on the inner annular surface 420 in a similar fashion.

Specifically, there is a shortest distance between each of the protruding structures 450 and the central axis of the annular optical spacer 400, and the shortest distances are the same. The protruding structures 450 are equally spaced around the central axis of the annular optical spacer 400. Each of the protruding structures 450 includes a surface length and a plurality of widths. The surface length is a farthest distance between two points on a surface of each of the protruding structure 450. The widths are perpendicular to the surface length, and the widths become smaller as getting closer to the central axis of the annular optical spacer 400. The protruding structures 450 are connected with each other. A cross-section of each of the protruding structures 450 is arc-shaped. The protruding structures 450 have a same shape and a same size.

The annular optical spacer 400 is made of plastic material.

A shortest distance between the first side surface 430 and the central axis of the annular optical spacer 400 is D1. A shortest distance between the second side surface 440 and the central axis of the annular optical spacer 400 is D2. A distance between the first side surface 430 and the second side surface 440 in parallel with the central axis of the annular optical spacer 400 is T12. A maximum outer diameter of the annular optical spacer 400 is Dmax. A maximum curvature radius of each of the protruding structures 450 is Rmax. A light absorption rate of the annular optical spacer 400 is Ac. A distance between the bent portion 460 and the central axis of the annular optical spacer 400 is D3.

The values of D1, D2, D1/D2, Dmax, T12/Dmax, Rmax, Ac and D3 of the 3rd example are shown in Table 3.

TABLE 3

| 3rd example | | | |
|---|---|---|---|
| D1 (mm) | 1.525 | T12/Dmax | 0.12 |
| D2 (mm) | 2.250 | Rmax (mm) | 0.03 |
| D1/D2 | 0.678 | Ac (%) | 96 |
| Dmax (mm) | 5.100 | D3 (mm) | 2.000 |

4TH EXAMPLE

FIG. 6A is a front schematic view of an annular optical spacer 500 according to 4th example of the present disclosure. FIG. 6B is a partially enlarged cross-sectional view taken along line 6b-6b of the annular optical spacer 500 in FIG. 6A. The annular optical spacer 500 includes an outer annular surface 510, an inner annular surface 520, a first side surface 530, a second side surface 540 and a plurality of protruding structures 550. The inner annular surface 520 surrounds a central axis (its reference numeral is omitted) of the annular optical spacer 500 and is opposite to the outer annular surface 510. The first side surface 530 connects the outer annular surface 510 with the inner annular surface 520. The second side surface 540 connects the outer annular surface 510 with the inner annular surface 520 and is opposite to the first side surface 530. The protruding structures 550 are regularly disposed on the inner annular surface 520. Each of the protruding structures 550 extends along a direction from the first side surface 530 to the second side surface 540, and is integrated with the inner annular surface 520.

Only three of the protruding structures 550 are shown in FIG. 6A for simplifying. The other non-shown protruding structures 550 are disposed on the inner annular surface 520 in a similar fashion.

Specifically, there is a shortest distance between each of the protruding structures 550 and the central axis of the annular optical spacer 500, and the shortest distances are the same. The protruding structures 550 are equally spaced around the central axis of the annular optical spacer 500. An angle A is existed between a projecting direction of a extending direction of each of the protruding structures 550 projecting on a plane perpendicular to the central axis and a shortest distance between a central point of each of the protruding structures 550 and the central axis. Each of the protruding structures 550 includes a surface length and a plurality of widths. The surface length is a farthest distance between two points on a surface of each of the protruding structure 550. The widths are perpendicular to the surface length, and the widths become smaller as getting closer to the central axis of the annular optical spacer 500. The protruding structures 550 are connected with each other. A cross-section of each of the protruding structures 550 is arc-shaped. The protruding structures 550 have a same shape and a same size.

The annular optical spacer 500 is made of metallic material.

A shortest distance between the first side surface 530 and the central axis of the annular optical spacer 500 is D1. A shortest distance between the second side surface 540 and the central axis of the annular optical spacer 500 is D2. A distance between the first side surface 530 and the second side surface 540 in parallel with the central axis of the annular optical spacer 500 is T12. A maximum outer diameter of the annular optical spacer 500 is Dmax. A maximum curvature radius of each of the protruding structures 550 is Rmax. A light absorption rate of the annular optical spacer 500 is Ac.

The values of D1, D2, D1/D2, Dmax, T12/Dmax, Rmax and Ac of the 4th example are shown in Table 4.

TABLE 4

| 4th example | | | |
|---|---|---|---|
| D1 (mm) | 1.580 | T12/Dmax | 0.12 |
| D2 (mm) | 2.220 | Rmax (mm) | 0.05 |
| D1/D2 | 0.712 | Ac (%) | 95 |
| Dmax (mm) | 5.100 | | |

5TH EXAMPLE

Figure 7A:
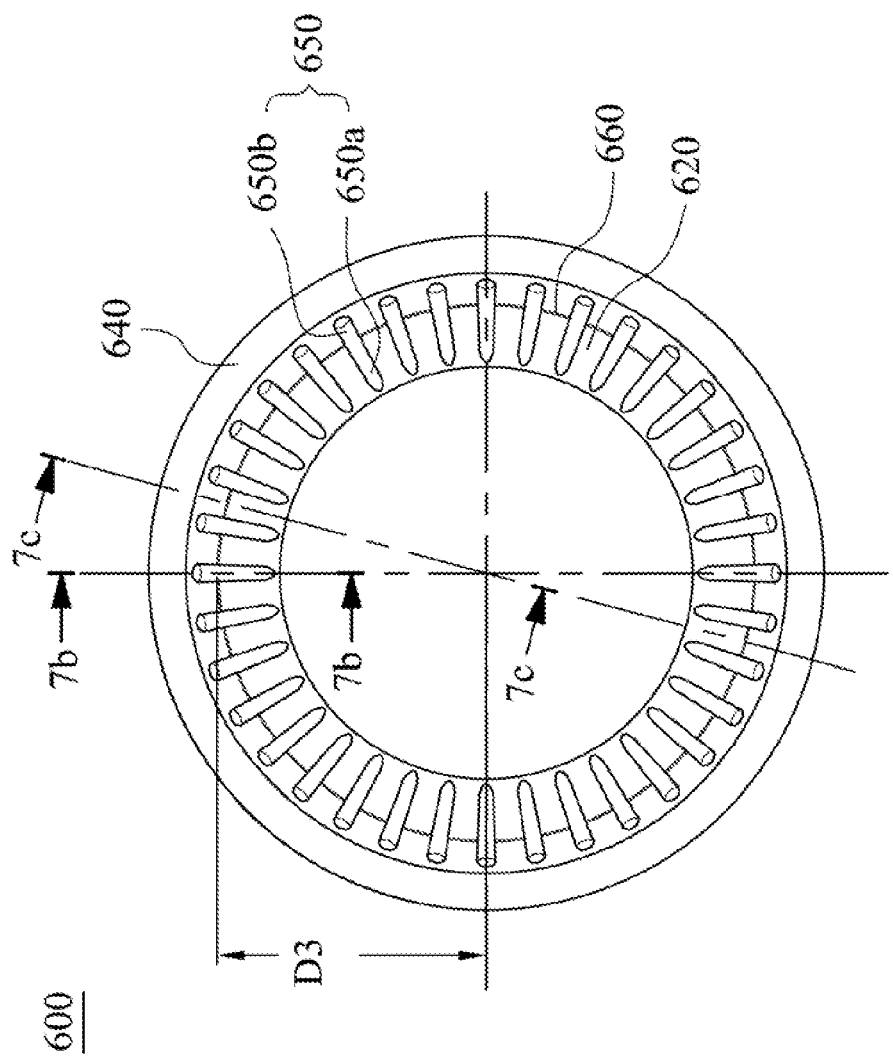
FIG. 7A is a front schematic view of an annular optical spacer according to 5th example of the present disclosure.
Figure 7B:
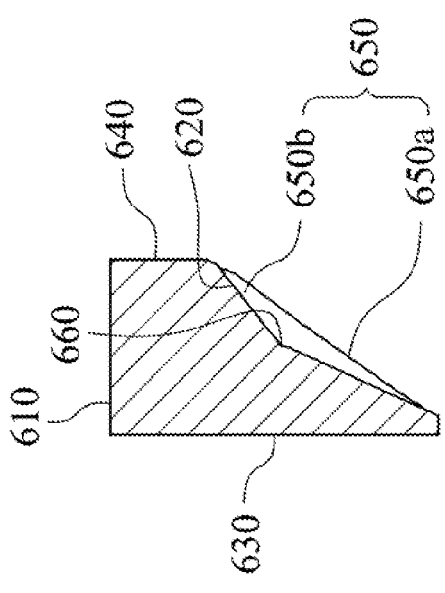
FIG. 7B is a partially enlarged cross-sectional view taken along line 7b-7b of the annular optical spacer in FIG. 7A.
Figure 7C:
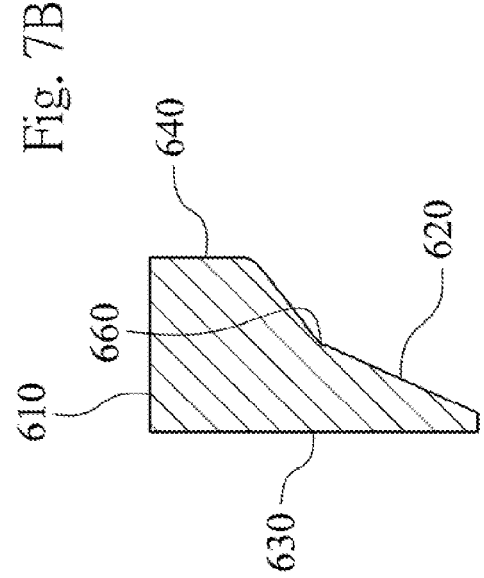
FIG. 7C is a partially enlarged cross-sectional view taken along line 7c-7c of the annular optical spacer in FIG. 7A.

FIG. 7A is a front schematic view of an annular optical spacer 600 according to 5th example of the present disclosure. FIG. 7B is a partially enlarged cross-sectional view taken along line 7b-7b of the annular optical spacer 600 in FIG. 7A. FIG. 7C is a partially enlarged cross-sectional view taken along line 7c-7c of the annular optical spacer 600 in FIG. 7A. The annular optical spacer 600 includes an outer annular surface 610, an inner annular surface 620, a first side surface 630, a second side surface 640, a bent portion 660 and a plurality of protruding structures 650. The inner annular surface 620 surrounds a central axis (its reference numeral is omitted) of the annular optical spacer 600 and is opposite to the outer annular surface 610. The first side surface 630 connects the outer annular surface 610 with the inner annular surface 620. The second side surface 640 connects the outer annular surface 610 with the inner annular surface 620 and is opposite to the first side surface 630. The bent portion 660 is formed on the inner annular surface 620 and located between the first side surface 630 and the second side surface 640. The protruding structures 650 are regularly disposed on the inner annular surface 620. Each of the protruding structures 650 extends along a direction from the first side surface 630 to the second side surface 640, and is integrated with the inner annular surface 620. Each of the protruding structures 650 includes a first protruding portion 650a and a second protruding portion 650b. The second protruding portions 650b are disposed farther from the central axis than the first protruding portions 650a. The first protruding portions 650a are disposed between the first side surface 630 and the bent portion 660, and the second protruding portions 650b are disposed between the bent portion 660 and the second side surface 640.

Specifically, there is a shortest distance between each of the protruding structures 650 and the central axis of the annular optical spacer 600, and the shortest distances are the same. The protruding structures 650 are equally spaced around the central axis of the annular optical spacer 600. The protruding structures 650 are not connected with each other. Each of the protruding structures 650 includes a surface length and a plurality of widths. The surface length is a farthest distance between two points on a surface of each of the protruding structure 650. The widths are perpendicular to the surface length, and the widths become smaller as getting closer to the central axis of the annular optical spacer 600. A cross-section of each of the protruding structures 650 is arc-shaped. The protruding structures 650 have a same shape and a same size.

The annular optical spacer 600 is made of plastic material.

A shortest distance between the first side surface 630 and the central axis of the annular optical spacer 600 is D1. A shortest distance between the second side surface 640 and the central axis of the annular optical spacer 600 is D2. A distance between the first side surface 630 and the second side surface 640 in parallel with the central axis of the annular optical spacer 600 is T12. A maximum outer diameter of the annular optical spacer 600 is Dmax. A maximum curvature radius of each of the protruding structures 650 is Rmax. A light absorption rate of the annular optical spacer 600 is Ac. A distance between the bent portion 660 and the central axis of the annular optical spacer 600 is D3.

The values of D1, D2, D1/D2, Dmax, T12/Dmax, Rmax, Ac and D3 of the 5th example are shown in Table 5.

TABLE 5

| 5th example | | | |
|---|---|---|---|
| D1 (mm) | 1.560 | T12/Dmax | 0.21 |
| D2 (mm) | 2.270 | Rmax (mm) | 0.07 |
| D1/D2 | 0.687 | Ac (%) | 96 |
| Dmax (mm) | 5.100 | D3 (mm) | 2.020 |

6TH EXAMPLE

Figure 8A:
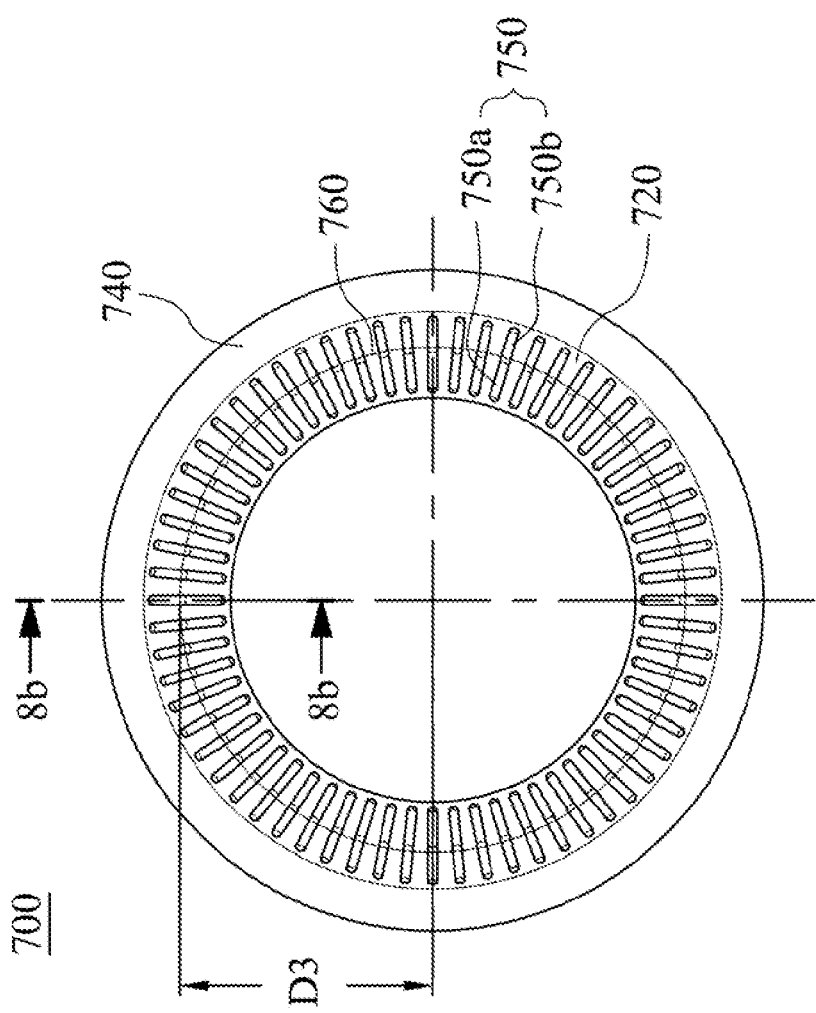
FIG. 8A is a front schematic view of an annular optical spacer according to 6th example of the present disclosure.
Figure 8B:
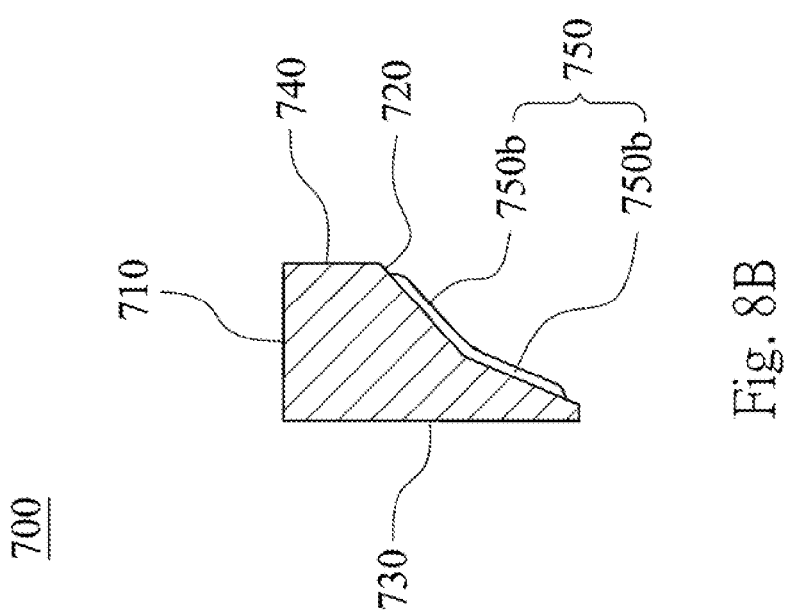
FIG. 8B is a partially enlarged cross-sectional view taken along line 8b-8b of the annular optical spacer in FIG. 8A.

FIG. 8A is a front schematic view of an annular optical spacer 700 according to 6th example of the present disclosure. FIG. 8B is a partially enlarged cross-sectional view taken along line 8b-8b of the annular optical spacer 700 in FIG. 8A. The annular optical spacer 700 includes an outer annular surface 710, an inner annular surface 720, a first side surface 730, a second side surface 740, a bent portion 760 and a plurality of protruding structures 750. The inner annular surface 720 surrounds a central axis (its reference numeral is omitted) of the annular optical spacer 700 and is opposite to the outer annular surface 710. The first side surface 730 connects the outer annular surface 710 with the inner annular surface 720. The second side surface 740 connects the outer annular surface 710 with the inner annular surface 720 and is opposite to the first side surface 730. The bent portion 760 is formed on the inner annular surface 720 and located between the first side surface 730 and the second side surface 740. The protruding structures 750 are regularly disposed on the inner annular surface 720. Each of the protruding structures 750 extends along a direction from the first side surface 730 to the second side surface 740, and is integrated with the inner annular surface 720. Each of the protruding structures 750 includes a first protruding portion 750a and a second protruding portion 750b. The second protruding portions 750b are disposed farther from the central axis than the first protruding portions 750a. The first protruding portions 750a are disposed between the first side surface 730 and the bent portion 760, and the second protruding portions 750b are disposed between the bent portion 760 and the second side surface 740.

Specifically, there is a shortest distance between each of the protruding structures 750 and the central axis of the annular optical spacer 700, and the shortest distances are the same. The protruding structures 750 are equally spaced around the central axis of the annular optical spacer 700. The protruding structures 750 are not connected with each other. A cross-section of each of the protruding structures 750 is arc-shaped. The protruding structures 750 have a same shape and a same size.

The annular optical spacer 700 is made of plastic material.

A shortest distance between the first side surface 730 and the central axis of the annular optical spacer 700 is D1. A shortest distance between the second side surface 740 and the central axis of the annular optical spacer 700 is D2. A distance between the first side surface 730 and the second side surface 740 in parallel with the central axis of the annular optical spacer 700 is T12. A maximum outer diameter of the annular optical spacer 700 is Dmax. A maximum curvature radius of each of the protruding structures 750 is Rmax. A light absorption rate of the annular optical spacer 700 is Ac. A distance between the bent portion 760 and the central axis of the annular optical spacer 700 is D3.

The values of D1, D2, D1/D2, Dmax, T12/Dmax, Rmax, Ac and D3 of the 6th example are shown in Table 6.

TABLE 6

| 6th example | | | |
|---|---|---|---|
| D1 (mm) | 1.560 | T12/Dmax | 0.12 |
| D2 (mm) | 2.230 | Rmax (mm) | 0.03 |
| D1/D2 | 0.7000 | Ac (%) | 95 |
| Dmax (mm) | 5.100 | D3 (mm) | 1.950 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An annular optical spacer, comprising:
   an outer annular surface;
   an inner annular surface surrounding a central axis of the annular optical spacer and opposite to the outer annular surface;
   a first side surface connecting the outer annular surface with the inner annular surface;
   a second side surface connecting the outer annular surface with the inner annular surface and opposite to the first side surface; and
   a plurality of protruding structures regularly disposed on the inner annular surface, wherein each of t he protruding structures extends along a direction from the first side surface to the second side surface, and each of the protruding structures is integrated with the inner annular surface.

2. The annular optical spacer of claim 1, wherein there is a shortest distance between each of the protruding structures and the central axis of the annular optical spacer, and the shortest distances are the same.

3. The annular optical spacer of claim 2, wherein a light absorption rate of the annular optical spacer is Ac, and the following relationship is satisfied:

$$Ac>90\%.$$

4. The annular optical spacer of claim 2, wherein the annular optical spacer is made of plastic material.

5. The annular optical spacer of claim 2, wherein the annular optical spacer is made of metallic material.

6. The annular optical spacer of claim 2, wherein a shortest distance between the first side surface and the central axis of the annular optical spacer is D1, a shortest distance between the second side surface and the central axis of the annular optical spacer is D2, and the following relationship is satisfied:

$$D1<D2.$$

7. The annular optical spacer of claim 6, wherein the shortest distance between the first side surface and the central axis of the annular optical spacer is D1, the shortest distance between the second side surface and the central axis of the annular optical spacer is D2, and the following relationship is satisfied:

$$0.50<D1/D2<0.90.$$

8. The annular optical spacer of claim 6, wherein a distance between the first side surface and the second side surface in parallel with the central axis of the annular optical spacer is T12, a maximum outer diameter of the annular optical spacer is Dmax, and the following relationship is satisfied:

$$0.03<T12/Dmax<0.5.$$

9. The annular optical spacer of claim 8, wherein the distance between the first side surface and the second side surface in parallel with the central axis of the annular optical spacer is T12, the maximum outer diameter of the annular optical spacer is Dmax, and the following relationship is satisfied:

0.05<$T$12/$D$max<0.2.

10. The annular optical spacer of claim 6, further comprising:
    a bent portion formed on the inner annular surface and located between the first side surface and the second side surface.

11. The annular optical spacer of claim 10, wherein each of the protruding structures comprises a first protruding portion and a second protruding portion, the second protruding portions are disposed farther from the central axis of the annular optical spacer than the first protruding portions, the first protruding portions are disposed between the first side surface and the bent portion, and the second protruding portions are disposed between the bent portion and the second side surface.

12. The annular optical spacer of, claim 2, wherein the protruding structures are equally spaced around the central axis of the annular optical spacer.

13. The annular optical pacer of claim 12, wherein each of the protruding structures comprises:
    a surface length, wherein the surface length is a farthest distance between two points on a surface of the protruding structure; and
    a plurality of widths perpendicular to the surface length, wherein the widths become smaller as getting closer to the central axis of the annular optical spacer.

14. The annular optical spacer of claim 13, wherein a cross-section of each of the protruding structures is triangular.

15. The annular optical spacer of claim 13, wherein the protruding structures are connected with each other.

16. The annular optical spacer of claim 15, wherein a maximum outer diameter of the annular optical spacer is Dmax, and the following relationship is satisfied:

Dmax<10 mm.

17. The annular optical spacer of claim 2, wherein a cross-section of each of the protruding structures is arc-shaped.

18. The annular optical spacer of claim 17, wherein a maximum curvature radius of each of the protruding structures is Rmax, and the following relationship is satisfied:

0.01 mm<Rmax.

19. The annular optical spacer of claim 17, wherein the protruding structures have a same shape.

20. The annular optical spacer of claim 19, wherein the protruding structures have a same size.

21. An optical lens system for mobile terminals, comprising:
    a barrel;
    a lens assembly disposed in the barrel; and
    an annular optical spacer disposed in the barrel and connected with the lens assembly, the annular optical spacer comprising:
    an outer annular surface;
    an inner annular surface surrounding a central axis of the annular optical spacer and opposite to the outer annular surface;
    a first side surface connecting the outer annular surface with the inner annular surface;
    a second side surface connecting the outer annular surface with the inner annular surface and opposite to the first side surface; and
    a plurality of protruding structures regularly disposed on the inner annular surface, wherein each of the protruding structures extends along a direction from the first side surface to the second side surface, and each of the protruding structures is integrated with the inner annular surface.

* * * * *